United States Patent

Tani et al.

[11] Patent Number: 6,108,094
[45] Date of Patent: *Aug. 22, 2000

[54] ULTRA-MINUTE MICROSCOPE FOR SPECTROSCOPY

[75] Inventors: Toshiro Tani; Hiroshi Yokoyama, both of Tsukuba; Martin Vacha, Tanashi, all of Japan

[73] Assignee: Agency of Industrial Science & Technology, Ministry of International Trade & Industry, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/249,138

[22] Filed: Feb. 12, 1999

[30] Foreign Application Priority Data

Feb. 12, 1998 [JP] Japan ................................. 10-029362

[51] Int. Cl.[7] ................................................. G01N 21/25
[52] U.S. Cl. ............................................................. 356/417
[58] Field of Search ................................... 359/368–398, 359/649–655; 356/326, 319, 300, 317–318, 417, 301; 250/458.1, 459.1, 461.1, 461.2

[56] References Cited

U.S. PATENT DOCUMENTS 5,587,832 12/1996 Krause .
5,880,880 3/1999 Anderson et al. .

FOREIGN PATENT DOCUMENTS 55-163436 12/1980 Japan .
63-317770 12/1988 Japan .
64-88338 4/1989 Japan .
2-218941 8/1990 Japan .
8-15156 1/1996 Japan .
9-210906 8/1997 Japan .
9-318881 12/1997 Japan .
10-62347 3/1998 Japan .

OTHER PUBLICATIONS

Heidelberg Instruments "Production Information . . . Microscope" Mar. 1987 p. 1–12.
Wilke "Optical Scanning . . . Microscope" Scanning vol. 7,2 1985 pp. 88–96.
Mitsuru Ishikawa, 21ST Research Report Meeting of Sakigake Meeting, pp. 9–14, "Collected Substances of Lecture on Light and Material", 1995 (with English Abstracts).
Martin Vacha, et al., Review of Scientific Instruments, vol. 68, No. 1, pp. 254–255, "Implementation of a SELFOC Lens for the Light Collection Element for Single Molecule Spectroscopy at Cryogenic Temperatures", Jan. 1997.

*Primary Examiner*—K. P. Hantis
*Attorney, Agent, or Firm*—Oblon, Spivak, McClelland, Maier & Neustadt, P.C

[57] ABSTRACT

An ultra-minute microscope for spectroscopy includes a rod-shaped lens having an index of refraction distribution gradient and capable of having a sample mounted on one end surface thereof, an element for projecting a laser beam into the rod-shaped lens from another end surface thereof and converging it to a focal point at an interface region between the one end surface of the rod-shaped lens and the sample, and a scanner for varying the incidence angle of the laser beam to scan the focal point two-dimensionally on the one end surface.

18 Claims, 4 Drawing Sheets

ULTRA-MINUTE MICROSCOPE FOR SPECTROSCOPY

BACKGROUND OF THE INVENTION

1. Field of the Invention

This invention relates to an ultra-minute microscope for spectroscopy enabling emission, scattering and absorption spectroscopy by use of a high-resolution wavelength-variable laser and more particularly to an ultra-minute microscope for spectroscopy enabling real-time observational spectroscopy on functional dye molecules, light-emitting centers, quantum dots, quantum wires and other single-quantum structures and molecules in solution, chemical reactions, genes, proteins, cells and so on.

2. Description of the Prior Art

Although single-molecule spectroscopy is a new science whose theoretical possibility was verified only several years ago, its extremely powerful spectroscopic capability is already contributing to steady elucidation of the fundamentals of micro-scale interactions. However, the spectroscopic sensitivity is still insufficient owing to the weak signal strength and measurement instrument technologies. The kinds of molecules that can be detected therefore remains severely limited.

Single-molecule spectroscopy involves observation of the fluorescence excitation spectrum from individual molecules embedded in a solid substance when the molecules are excited at cryogenic temperatures by a wavelength-variable laser exhibiting high monochromaticity. An essential requirement for this observation is that the number of molecules excited by the laser beam be reduced to the absolute minimum. This is achieved by attaching the end face of a single-mode optical fiber directly to the sample, focusing the excitation light by use of a small lens, or placing the sample behind a pinhole.

In addition, the density of the sample has to be diluted to at least around $10^{-7}$ to $10^{-8}$ mole/liter. The optical system collecting light emitted from a single molecule generally uses a parabolic mirror, an elliptical mirror, or a microscope object lens. These components are large and tend not to be so efficient in actual application. Sample mounting requires a high degree of skill, while handling requires meticulous care and is highly troublesome.

In order to overcome these problems of the prior art, the inventors earlier developed an ultra-minute light collecting system for spectroscopy that, in essence, uses a gradient index rod-shaped micro-lens to reduce the number of reflecting mirrors and optical components at the interface, eliminate loss caused by the presence of the multiple lens surfaces of an objective lens or the like and further enhance signal light collection efficiency by directly using the end face of the rod-shaped lens as the sample substrate, thereby basically enabling integration of all required functions in a single optical element (see Japanese Patent Public Disclosure Hei 10-62347).

The performance of this light collecting system was compared with that of existing technologies. Molecules of terrylene, a conjugated polycyclic compound excellent in light emission efficiency, were selected as the molecular species for spectroscopy. The sample was prepared by dispersion-doping the terrylene molecules into a crystalline medium consisting of linear chain alkane molecules (i.e., Shpolskii medium). A thin film of tungsten was vapor-deposited on one end surface of a 0.25-pitch, 1.8 mm-diameter rod-shaped lens and an approximately 4 $\mu$m-diameter hole was formed at the center of the film. The sample was packed into the hole and spectroscopy was conducted at a temperature of 1.7K. Good emission spectrum signals were obtained from the single molecules.

The spectrum broadening behavior due to saturation with increasing excitation light intensity was quantitatively measured and compared with the results obtained with other experiments. The good agreement warranted the conclusion that the spectral signals were signals from single molecules. The level of the background noise was approximately the same as that in existing methods but the excitation light intensity that gave about the same level of signal was in effect markedly lower than by the existing light-collecting systems, eventually improving a signal-to-noise (S/N) ratio greatly. This demonstrated the potential of the light collecting system to provide a marked efficiency improvement.

In this earlier developed light collecting system, the minute space for accommodating the sample was, as explained above, secured by providing the thin metal film coating and forming at the center thereof a pinhole of several micrometers in diameter. It is otherwise possible to bring a single-mode optical fiber close to the center of the rod-shaped lens surface, utilize the intervening gap and use the minute space formed by the single-mode optical fiber core as the minute space for holding the sample. However, these methods of securing the minute space are disadvantageous in that they hinder efficient use of the light collecting system. They also make it impossible to acquire 2-D, 3-D nor real-time images.

An object of this invention is therefore to overcome the foregoing disadvantages by providing an ultra-minute microscope for spectroscopy that can be operated with high efficiency and can provide 2-D, 3-D and real-time images.

SUMMARY OF THE INVENTION

The ultra-minute microscope for spectroscopy provided by the invention to achieve this object is applied in an optical apparatus for the observation of emission, scattering and absorption spectroscopy of sample microstructures, including single molecules and single polymer molecules, single quantum dots, quantum wires, quantum wells, clusters, aggregates and so on. In a first aspect of the invention, the ultra-minute microscope for spectroscopy according to the invention comprises a rod-shaped lens having an index of refraction distribution gradient and capable of having a sample mounted on one end surface thereof, an element for projecting a laser beam into the rod-shaped lens from another end surface thereof and converging it to a focal point at an interface region between the one end surface of the rod-shaped lens and the sample, and a scanner for varying an incidence angle of the laser beam to scan the focal point two-dimensionally on the one end surface.

A second aspect of the invention further provides an ultra-minute microscope for spectroscopy comprising a rod-shaped lens having an index of refraction distribution gradient and capable of having a sample mounted on one end surface thereof, an element for projecting a laser beam into the rod-shaped lens from another end surface thereof and converging it to a focal point at an interface region between the one end surface of the rod-shaped lens and the sample, and a two-dimensional detector for detecting signal light from the sample.

Thus, in the present invention the rod-shaped lens focuses the laser beam entering its other end surface at the interface region between the one end surface thereof and the sample mounted thereon. This eliminates the need to provide a minute space for accommodating the sample. The microscope can therefore be efficiently operated.

In the first aspect of the invention, 2-D images of the sample can be acquired by varying the incidence angle of the laser beam so as to scan the focal point over the interfacing region with the sample.

In the second aspect of the invention, 2-D images of the sample can be acquired by detecting the signal light from the sample by the two-dimensional detector, which can be a charge-coupled device (CCD) or the like.

In addition, 3-D images can be acquired by varying the divergence of the laser beam so as to scan the focal point in the depth direction normal to the one end surface.

Further, real-time images at the interface region of the sample can be acquired by the two-dimensional detector by introducing the one end surface of the rod-shaped lens for mounting the sample directly into a sample solution.

DESCRIPTION OF THE PREFERRED EMBODIMENTS

Figure 1:
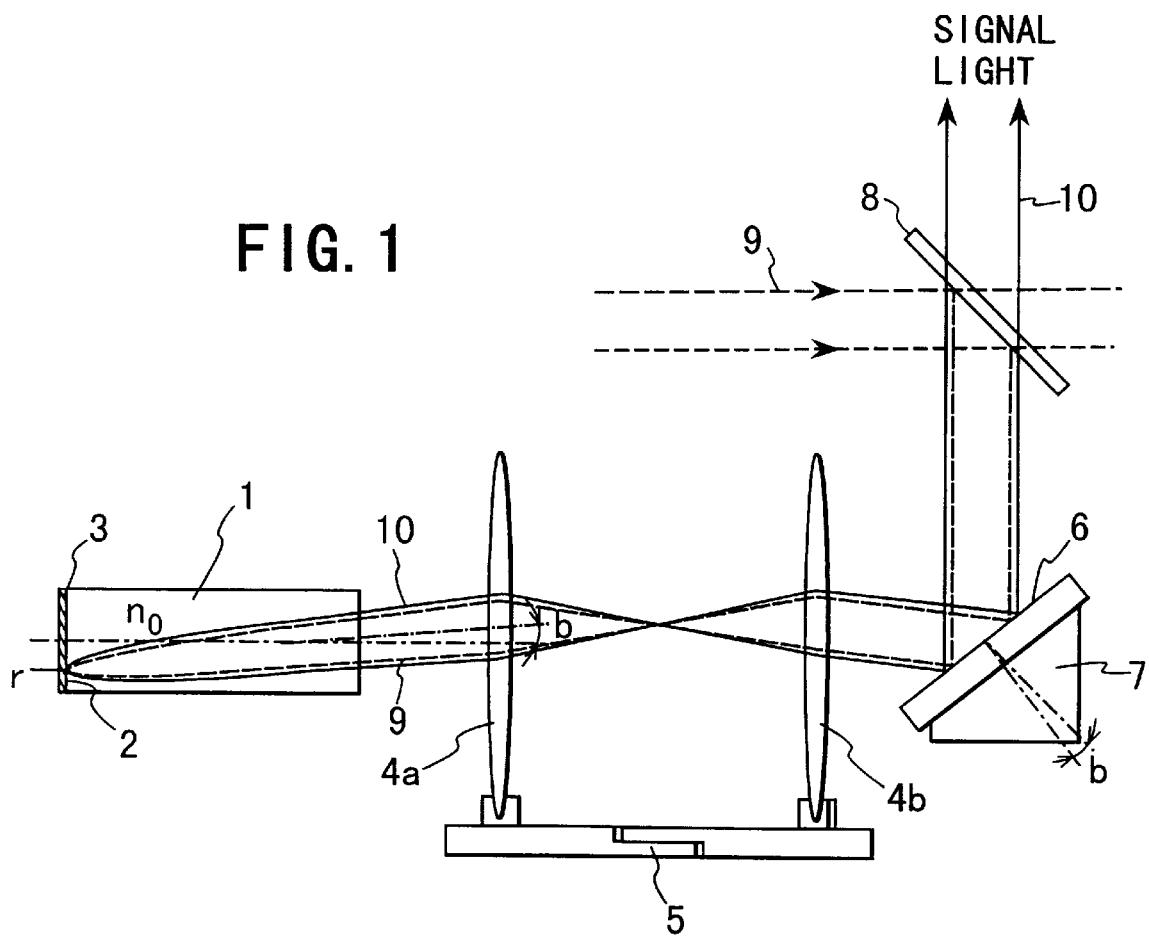
FIG. 1 is a diagram showing an ultra-minute microscope for spectroscopy that is an embodiment of the invention.

FIG. 1 shows an ultra-minute microscope for spectroscopy that is an embodiment of the invention for application in an optical apparatus for the observation of emission, scattering and other spectroscopy of sample microstructures including single molecules, single polymer molecules, single quantum dots, quantum wires and wells, clusters, aggregates and so on. The microscope includes a back-illumination type optical system and a 2-D/3-D scanning system. Reference numeral 1 in the figure designates a rod-shaped lens having an index of refraction distribution gradient. A sample 3 to be spectroscopically observed is mounted on one end surface 2 of the lens 1. On the optical axis at the other end of the lens 1 are disposed in order a lens 4a, a lens 4b and a flat mirror 6 oriented at an angle of e.g. about 45° to the optical axis. A beam splitter 8 is provided above the flat mirror 6.

The lenses 4a, 4b are supported on a slider 5 and the flat mirror 6 is supported at a prescribed angle on a fine angle adjuster 7. By this arrangement, a laser beam can be projected into the lens 1 and be converged at the interface region between the one end face 2 of the lens and the sample 3.

In the invention ultra-minute microscope for spectroscopy configured in the foregoing manner, a laser beam 9 of variable wavelength and high wavelength resolution, indicated by broken lines in FIG. 1, enters the optical system through the beam splitter 8, is reflected by the flat mirror 6, passes through the lenses 4a, 4b, enters the lens 1 through an end surface thereof, and is focused at the interface between the one end surface 2 and the sample 3. As shown by solid lines, the fluorescence emission from the molecule species upon exposure of the sample 3 to the laser light is extracted as signal light 10 through the beam splitter 8 and forwarded to a detector (not shown) that determines its fluorescence excitation spectrum.

The excitation laser beam 9 thus enters the rod-shaped lens 1 through its end surface at the opposite extremity from that on which the sample 3 is mounted. By this, the waist region of the laser beam 9 where it is focused at the interfacing region with the sample 3 can be utilized as the minute space. This feature of the invention particularly enables realization of an ultra-minute single-molecule spectroscopic apparatus.

Owing to its use of this means to secure the minute space for the sample, the invention, unlike the prior art apparatus, does not require the process of first providing a metal film coating and then forming a hole of several micrometers in diameter in the coating by a wet process or by a dry process using a focused ion beam. The invention thus provides a marked improvement in convenience of use.

The incidence angle of the excitation laser beam with respect to the rod-shaped lens 1 can be varied by means of the fine angle adjuster 7 so as to scan the focal point two-dimensionally at the interface region. The measured values represented by the signal light 10 can then be computer-processed in conjunction with positional data regarding the focal point to represent the results of the measurement as a two-dimensionally scanned image. This use of the fine angle adjuster 7 to scan the incidence angle is advantageous in that it provides greater magnification than can be obtained by, for example, a system that effects scanning by directly driving a sample stage or the like. Moreover, this capability, in combination with the ability of the steering lens system (4a, 4b) to freely vary the focal distance, enables the invention to achieve high resolution with a simple scanning mechanism.

In accordance with this invention, it is possible to preselect specific points within the image obtained by imaging with the optical apparatus and then to measure the spectra of the individual or single microstructures at these points. Moreover, in an application as a single-molecule spectroscopic apparatus, after a specific spectrum has been obtained, scanning can be conducted to obtain data regarding the spatial structure surrounding the observed point.

Since the invention uses the rod-shaped lens 1, which is much shorter than an optical fiber or the like, the excitation laser beam 9 can be changed into those with ultrashort light pulses to effect time-resolved spectroscopy.

The invention can also be used with basically good compatibility to effect measurements on liquid samples. In this case, the one end surface 2 of the rod-shaped lens 1 is introduced directly into the sample solution and an appropriate channel or flow is applied to conduct a cell-sorter-like operation accompanied by simultaneous in-vivo observation or the like of the optical and/or physical behavior of biological macromolecules, cells, etc. labeled with fluorescent probes.

In accordance with the invention, data resolved spatially into three dimensions can be extracted by operating the optical system to regulate the divergence of the incident laser beam and scanning the focal point in the depth direction of the sample.

According to this invention, by merely placing the rod-shaped lens 1 on the surface of a semiconductor substrate formed with a quantum structure, it is possible to conduct non-destructive structural evaluation of semiconductor integrated circuits, optical integrated circuits and the like from the aspects of optical response characteristics and/or optical material properties. A compound semiconductor quantum structure is convenient from the point of emission efficiency. This should not be construed as limiting the invention, however, since there is also a need for emission/scattering analysis of Group VI semiconductor quantum structures, monolithic structures and many other types.

Figure 6A:
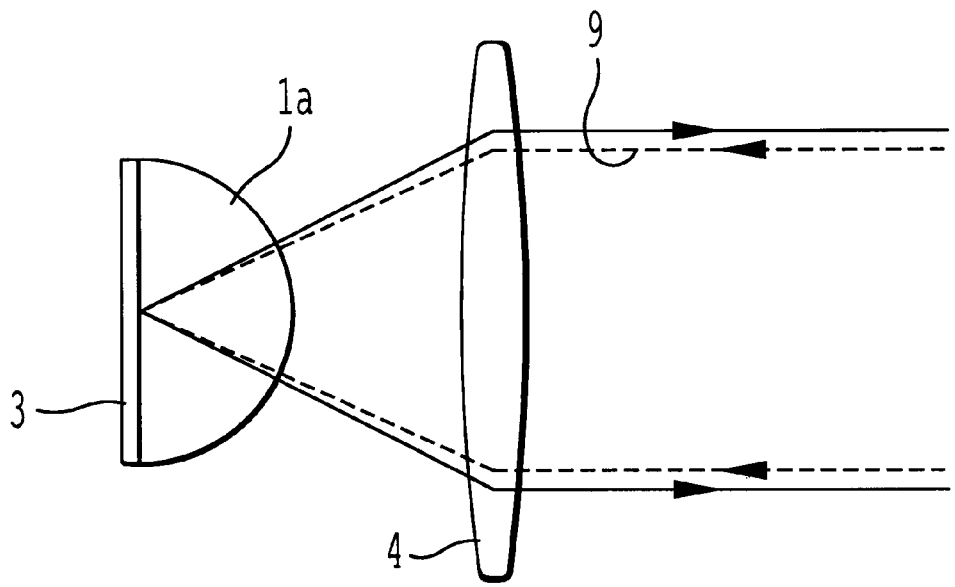
FIG. 6(a) is an explanatory view showing an ultra-minute microscope for spectroscopy using a hemispherical lens.
Figure 6B:
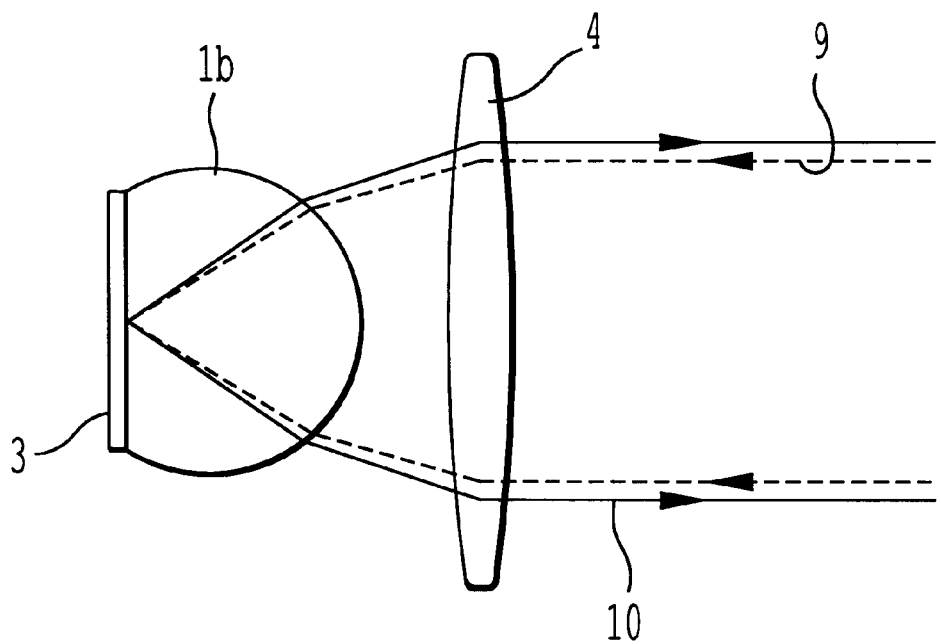
FIG. 6(b) is an explanatory view showing an ultra-minute microscope for spectroscopy using a ultra-spherical lens.

The miniature optical system and the back-illumination configuration in this invention is not limited to the rod-shaped lens but can also be realized in the form of a hemispherical lens 1a with a flat end surface as shown in FIG. 6(a), an ultra-spherical lens 1b as shown in FIG. 6(b), and the like.

Figure 2:
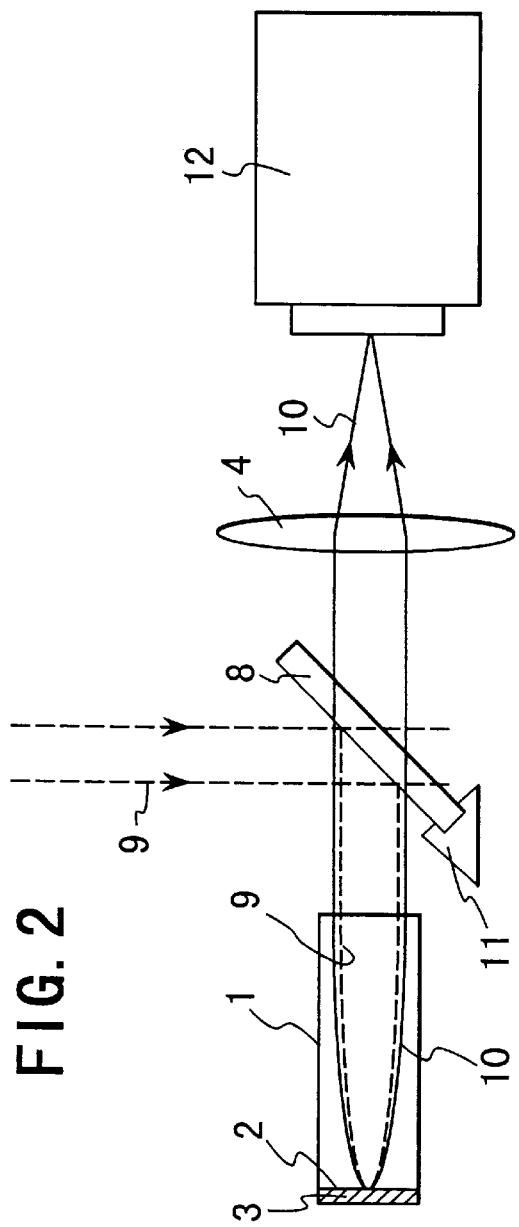
FIG. 2 is a diagram showing an ultra-minute microscope for spectroscopy that is another embodiment of the invention.

FIG. 2 shows an ultra-minute microscope for spectroscopy that is another embodiment of the invention, A rod-shaped lens 1 having an index of refraction distribution gradient has a sample 3 mounted on its one end surface 2. On the optical axis at the other end of the lens 1 are disposed in order a beam splitter 8, an imaging lens 4, and a CCD or other such two-dimensional detector 12.

A laser beam 9 enters the optical system through the beam splitter 8, enters the rod-shaped lens 1 through the other end surface thereof, and is focused at the interface between the one end surface 2 and the sample 3.

The fluorescence emission from the sample is extracted as signal light 10 and imaged on the two-dimensional detector (CCD) 12. The beam splitter 8 is supported on a fine angle adjuster 11. The focal point of the laser beam is scanned to obtain two-dimensional images of the scanned region simultaneously or in real time.

Figure 3:
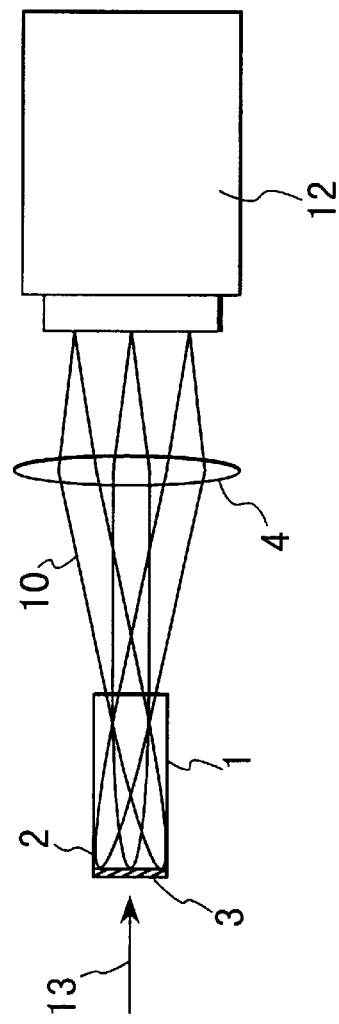
FIG. 3 is a diagram showing an ultra-minute microscope for spectroscopy that is another embodiment of the invention.

FIG. 3 is shows an ultra-minute microscope for spectroscopy that is another embodiment of the invention. A rod-shaped lens 1 has a sample 3 mounted on its one end surface 2 and illuminating light 13 is directed onto the surface of the sample 3 facing away from the one end surface 2. Fluorescence emission from molecule species of the sample is imaged on a CCD two-dimensional detector 12 as signal light by an imaging lens 4, thereby producing simultaneous or real-time two-dimensional images. The ultra-minute microscopes for spectroscopy according to the embodiments of FIGS. 2 and 3 provide the same features and advantages as that of FIG. 1.

While, as explained above, in the embodiment of FIG. 3, the sample 3 is illuminated by the light 13 from behind, a beam splitter like that in the embodiments of FIGS. 1 and 2 can be further provided and used together with an appropriate structure to simultaneously illuminate the sample 3 from behind and from inside the lens.

Examples of the invention and Comparative Examples will now be explained. The invention is, however, not limited to the specific Examples described below.

EXAMPLE 1

As the rod-shaped lens there was used a SELFOC lens produced by Nihon Sheet Glass (W20-S25-063N: diameter 2.0 mm, length 3.7 mm, pitch 0.25, central aperture angle 26.6 degrees). The sample was prepared by dissolving terrylene molecules in dodecane at about $10^{-8}$ mole/liter and placing a small drop on the surface of a 0.15 mm-thick cover slip. The slip was then pressed lightly onto one end surface of the rod-shaped lens to form a thin-film-like space of several to several tens of micrometers in thickness at the one end surface. This space was used as the sample space. The sandwiched solution adhering to the lens end surface was solidified by cooling to 1.7K and used as the test sample. The optical system shown in FIG. 1 was used to conduct spectroscopy utilizing a single mode dye laser of 570 nm region wavelength (jitter≦2.3 MHz) as the excitation light source. The fluorescence excitation spectrum during wavelength scanning of the light source was detected. Good 0—0 transition emission spectra from single molecules, with variously distributed full width at half maximum (FWHM) from the minimum of about 40 MHz even to higher than 100 MHz, were observed.

Figure 4:
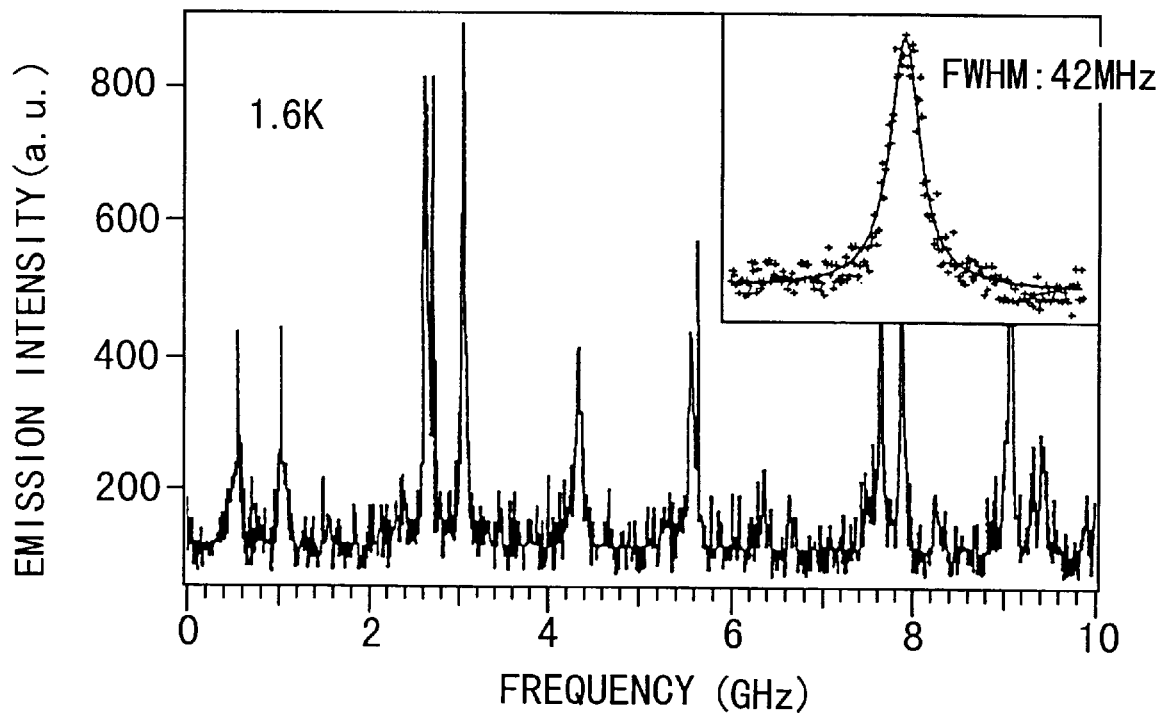
FIG. 4 is a graph showing fluorescence excitation spectra obtained by spectroscopy of molecules of terrylene in a dodecane crystalline medium using the invention microscope, the inset showing a typical single molecule spectrum obtained by enlarging a relatively narrow wavelength region.

FIG. 4 is a graph showing the fluorescence excitation spectra of individual terrylene molecules in the dodecane crystalline medium. The signal components of below 200 on the vertical axis are basically noise. The other components of above 200 are all true signals. The inset is an enlargement of the portion around 3 GHz. There was obtained a Lorentzian spectrum (solid line) with a spectral width of 42 MHz. Similar results were obtained when fluorescence spectra were detected by the same method except for changing the medium to tetradecane and hexadecane.

EXAMPLE 2

The SELFOC lens of Example 1 was again used as the rod-shaped lens. A polyvinyl sulfonate thin film doped with pseudoisocyanine (PIC), an organic dye, was directly prepared by the offset spin-coating method. A laser and a detection system like those of Example 1 were used to detect change in emission intensity with 77K and 1.6K spatial scanning. A signal indicating the shapes of fibril aggregates of PIC was obtained. When one-dimensional scanning was conducted in the direction perpendicular to the direction of fibril orientation, the results indicated that the fibril diameters measured up to around 1 micrometer and that the spatial resolution was below this.

EXAMPLE 3

As the rod-shaped lens there was used a SELFOC lens produced by Nihon Sheet Glass (H18-S25-063N: diameter 1.8 mm, pitch 0.25, central aperture angle 36.7 degrees). The sample was prepared by dissolving terrylene molecules in dodecane at about $10^{-8}$ mole/liter and placing a small drop on the surface of a 0.15 mm-thick cover slip. The slip was then pressed lightly onto one end surface of the rod-shaped lens to form a thin-film-like space of several to several tens of micrometers in thickness at the one end surface. This space was used as the sample space. The sandwiched solution adhering to the lens end surface was solidified by cooling to 1.6K and used as the test sample. An optical system like those in the foregoing Examples was used to detect an emission signal by combining single molecule spectroscopy and two-dimensional spatial scanning. The result clearly shows that the microscope can resolve the state of single molecules isolated in a spatial region in the order of several micrometers and that of cluster-like gatherings indicating statistical fine structures. It was ascertained that, based on the case of the single molecules, spatial resolution performance of under around 500 nm could be easily achieved even with no substantial adjustment (FIG. 5).

Figure 5:
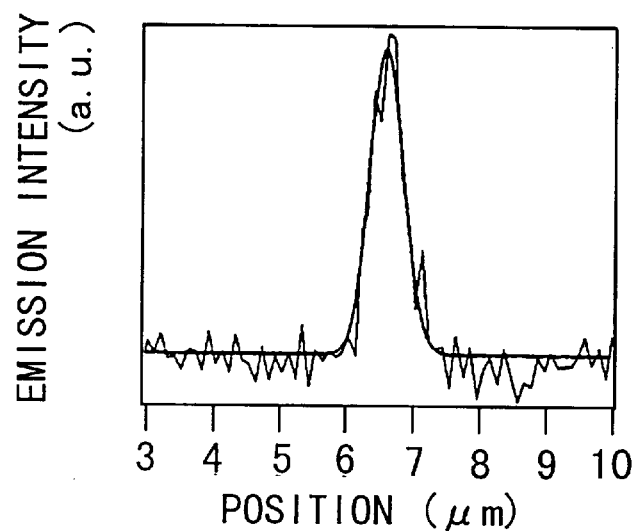
FIG. 5 is a graph showing a section of a spatially scanned 2-D image obtained by spectroscopy of a molecule of terrylene in a dodecane crystalline medium using the invention microscope.

FIG. 5 shows the sectional intensity distribution of a 2-D image obtained for a single terrylene molecule in a dodecane crystalline medium. The fitted Gaussian distribution curve (the thick solid line) shows that a spatial resolution of 490 mm was achieved.

Example 3 was repeated except for changing the medium to tetradecane and hexadecane. In the detection of a single molecule, a solid immersion lens (SIL) operation was confirmed from the fine tuning of the excitation laser beam divergence.

COMPARATIVE EXAMPLE 1

To demonstrate the capability of the invention microscope, a SELFOC lens (product of Nihon Sheet Glass) was used as the rod-shaped lens, a microfilm prerecorded with text was used as the sample, the lens end surface was brought in close contact with the film image surface, and an identical imaging optical system of ordinary optical microscope was used in common to compare the performance of this arrangement with that of the objective lens of an ordinary optical microscope. The performance of the aforementioned 2.0 mm diameter, 26.6-degree central aperture angle rod-shaped lens was equal to or better than that of an X100 objective lens (Olympus, MOlan; X100). The performance of a 1.8 mm diameter, 36.7-degree central aperture angle rod-shaped lens was much better than that of the X100 objective lens. It was verified that the SIL objective lens operation was realized with substantially no adjustment even when the sample was a microfilm not altogether satisfactory in tightness of contact.

COMPARATIVE EXAMPLE 2

To further demonstrate the capability of the invention microscope, a SELFOC lens produced by Nihon Sheet Glass (H18-S25-063N: diameter 1.8 mm, pitch 0.25, central aperture angle 36.7 degrees) was used and real-time, two-dimensional imaging capability was demonstrated using an imaging optical system of 1:1 at f=200 mm and a CCD light detector. With this optical system a 10-micrometer object on the end surface was transferred to the CCD surface as an approximately 1.36 mm real image, which is simply a magnification of 136 times. When, for example, a CCD detector with a pixel size of 6.8 micrometers is used, this corresponds to 200 pixels, a more than adequate performance of 50 nm per pixel.

The invention of the system for single molecule spectroscopy and the microscope is characterized by offering integration of a sample substrate, formation of a minute sample space, collimating and collecting functions of excitation and signal light into a single micro-scale optical system with a flat end surface like a rod-shaped gradient index lens, and by offering a compact, simple and versatile adjustment-free spectroscopic apparatus of high utility.

The invention system of using the end surface of a rod-shaped lens or the like as the sample substrate enables detection not only of dye molecules, aggregates, macromolecules, biological substances and their solutions but also of polymer thin films, LB films and semiconductor fine particles. It also makes it possible to evaluate semiconductor quantum dot structures, semiconductor quantum wire and well structures and so on simply by placing the rod-shaped lens on their crystal substrate surfaces.

Owing to these features of the invention, there can be realized a small microscope for single-molecule spectroscopy requiring substantially no adjustment or special skill to operate. The potential of the invention to provide specific technologies for evaluation of quantum dot structures, semiconductor quantum wire structures and other elements is also high. Moreover, the principle of the invention can, merely by slight modification of the lens structure, be applied to configure ultra-high density memory systems utilizing the near field effect.

What is claimed is:

1. A microscope for spectroscopy, comprising:

a lens having an index of refraction distribution gradient and having a first surface configured to be mounted by a sample;

means for projecting a laser beam into the lens from a second surface of the lens and converging said laser beam to a focal point at an interface region between the first surface of the lens and the sample;

scanning means for varying an incidence angle of the laser beam to scan the focal point two-dimensionally on the first surface; and a means for detecting a fluorescent excitation spectrum from said sample being excited by said laser beam.

2. A microscope for spectroscopy according to claim 1, further comprising means for varying divergence of the laser beam to vary the focal point in a depth direction normal to the first surface, thereby enabling acquisition of a three dimensional image by three-dimensionally scanning a specimen space.

3. A microscope for spectroscopy according to claim 1, wherein the means for projecting a laser beam into the lens from the second surface of the lens is replaced by means for projecting illuminating light onto the first surface of the lens.

4. A microscope for spectroscopy according to claim 1, further comprising means for projecting illuminating light onto the first surface of the lens.

5. The microscope for spectroscopy according to claim 1, wherein:

said lens is a rod-shaped lens, said first surface is a first end surface, and said second surface is a second end surface.

6. The microscope for spectroscopy according to claim 1, wherein said lens is a hemispherical lens.

7. The microscope for spectroscopy according to claim 1, wherein said lens is a ultra-spherical lens.

8. A microscope for spectroscopy, comprising:

a lens having an index of refraction distribution gradient and having a first surface configured to be mounted by a sample;

means for projecting a laser beam into the lens from a second surface of the lens and converging said laser beam to a focal point at an interface region between the first surface of the lens and the sample; and a two-dimensional detector for detecting a fluorescent excitation spectrum from the sample being excited by said laser beam.

9. A microscope for spectroscopy according to claim 8, further comprising means for varying divergence of the incident laser beam to vary the focal point in a depth direction normal to the first surface, thereby enabling acquisition of a three dimensional image by three-dimensionally scanning a specimen space.

10. A microscope for spectroscopy according to claim 8, wherein the means for projecting a laser beam into the lens from the second surface of the lens is replaced by means for projecting illuminating light onto the first surface of the lens.

11. A microscope for spectroscopy according to claim 8, further comprising means for projecting illuminating light onto the first surface of the lens.

12. The microscope for spectroscopy according to claim 8, wherein:

said lens is a rod-shaped lens, said first surface is a first end surface, and said second surface is a second end surface.

13. The microscope for spectroscopy according to claim 8, wherein said lens is a hemispherical lens.

14. The microscope for spectroscopy according to claim 8, wherein said lens is a ultra-spherical lens.

15. A microscope for spectroscopy, comprising:

a lens having an index of refraction distribution gradient and having a first surface configured to be mounted by a sample;

a projection mechanism configured to project light into the lens and configured to converge said light to a focal point at an interface region between the first surface of the lens and the sample;

a scanning device configured to vary an incidence angle of the light and to scan the focal point two-dimensionally on the first surface; and a detector configured to detect a fluorescent excitation spectrum from the sample being excited by said laser beam.

16. The microscope for spectroscopy according to claim 15, wherein:

said projection mechanism is configured to project a laser beam into the lens from a second surface of the lens and configured to converge said laser beam to a focal point at an interface region between the first surface of the lens and the sample, and said scanning device is configured to vary the incidence angle of the laser beam.

17. The microscope for spectroscopy according to claim 16, further comprising a divergence varying mechanism configured to vary divergence of the laser beam and to vary the focal point in a depth direction normal to the first surface.

18. The microscope for spectroscopy according to claim 15, wherein said projection mechanism is configured to project light into the lens from the first surface of the lens.

* * * * *